(12) United States Patent
Pietsch (10) Patent No.: US 10,987,891 B2
(45) Date of Patent: Apr. 27, 2021

(54) SINGLE-LAYER FOLDING CORE

(71) Applicant: Karsten Pietsch, Wismar (DE)

(72) Inventor: Karsten Pietsch, Wismar (DE)

( * ) Notice: Subject to any disclaimer, the term of this patent is extended or adjusted under 35 U.S.C. 154(b) by 395 days.

(21) Appl. No.: 15/746,777

(22) PCT Filed: Jul. 27, 2016

(86) PCT No.: PCT/EP2016/067932
§ 371 (c)(1),
(2) Date: Jan. 22, 2018

(87) PCT Pub. No.: WO2017/017149
PCT Pub. Date: Feb. 2, 2017

(65) Prior Publication Data
US 2019/0009495 A1 Jan. 10, 2019

(30) Foreign Application Priority Data

Jul. 27, 2015 (DE) .................... 10 2015 009 928.0
Jul. 27, 2015 (DE) .................... 20 2015 005 410.2

(51) Int. Cl.
| | |
|---|---|
| *B32B 3/12* | (2006.01) |
| *B32B 29/00* | (2006.01) |
| *B32B 5/02* | (2006.01) |
| *B32B 7/14* | (2006.01) |
| *B32B 27/06* | (2006.01) |

(Continued)

(52) U.S. Cl.
CPC .............. *B32B 3/12* (2013.01); *B29C 53/063* (2013.01); *B32B 3/04* (2013.01); *B32B 3/26* (2013.01); *B32B 3/28* (2013.01); *B32B 5/02* (2013.01); *B32B 7/05* (2019.01); *B32B 7/12* (2013.01); *B32B 7/14* (2013.01); *B32B 15/04* (2013.01); *B32B 15/046* (2013.01); *B32B 27/06* (2013.01); *B32B 29/002* (2013.01); *B29L 2024/003* (2013.01); *B32B 2307/546* (2013.01); *B32B 2307/734* (2013.01); *B32B 2419/00* (2013.01); *B32B 2607/00* (2013.01)

(58) Field of Classification Search
None
See application file for complete search history.

(56) References Cited

U.S. PATENT DOCUMENTS

| 2002/0094926 A1* | 7/2002 | Kling | ............. G06T 17/20 |
|---|---|---|---|
| | | | 493/356 |
| 2014/0349082 A1* | 11/2014 | Tien | ................ B32B 7/12 |
| | | | 428/179 |
| 2015/0109799 A1* | 4/2015 | Wu | .................. F21V 1/146 |
| | | | 362/352 |

FOREIGN PATENT DOCUMENTS

| CN | 1148360 A | 4/1997 |
|---|---|---|
| CN | 1878625 A | 12/2006 |

(Continued)

OTHER PUBLICATIONS

Pietsch, Karsten, machine translation of DE 20 2014 002924 Description, Apr. 14, 2014 (Year: 2014).*

(Continued)

*Primary Examiner* — Humera N. Sheikh
*Assistant Examiner* — Mary I Omori
(74) *Attorney, Agent, or Firm* — Lewis Roca Rothgerber Christie LLP (57) ABSTRACT

The invention relates to a method for producing a folding core (50, 190, 300, 360, 370, 380) for a lightweight structure, wherein in a first method step bending lines (70, 170, 180) are applied onto a deformable flat semi-finished product (40).

7 Claims, 10 Drawing Sheets

(51) Int. Cl.
| | |
|---|---|
| *B29C 53/06* | (2006.01) |
| *B32B 3/04* | (2006.01) |
| *B32B 3/28* | (2006.01) |
| *B32B 7/05* | (2019.01) |
| *B32B 7/12* | (2006.01) |
| *B32B 3/26* | (2006.01) |
| *B32B 15/04* | (2006.01) |
| *B29L 24/00* | (2006.01) |

(56) References Cited

FOREIGN PATENT DOCUMENTS

| | | |
|---|---|---|
| CN | 1878661 A | 12/2006 |
| CN | 102756531 A | 10/2012 |
| CN | 103917722 A | 7/2014 |
| CN | 104085134 A | 10/2014 |
| DE | 202014002924 U1 | 9/2014 |
| JP | 2009220362 A | 10/2009 |

OTHER PUBLICATIONS

Turner et al., A review of origami applications in mechanical engineering, Jun. 24, 2015 (Year: 2015).*
CNIPA Office Action dated Jun. 25, 2019, for corresponding Chinese Application No. CN2016800443774, 6 pages.
Anonymous, "Yoshizawa-Randlett system—Wikipedia", Jan. 28, 2019, XP55595260, 8 pages.
International Search Report and Written Opinion for corresponding PCT Application No. PCT/EP2016/067932, dated Oct. 12, 2016, 8 pages.

* cited by examiner

SINGLE-LAYER FOLDING CORE

CROSS-REFERENCE TO A RELATED APPLICATION

This application is a National Phase Patent Application of International Patent Application Number PCT/EP2016/067932, filed on Jul. 27, 2016, which claims priority of German Patent Application Numbers 10 2015 009 928.0, filed on Jul. 27, 2015 and 20 2015 005 410.2, filed on Jul. 27, 2015, the contents of all of which are incorporated herein by reference.

BACKGROUND

The invention relates to a single-layer folding core for the production of a lightweight structure.

Multiple-layer lightweight structures comprising a core which is arranged between two cover layers are usually referred to as sandwich structures or sandwich parts, and are known to persons skilled in the art. They are distinguished by a low weight while at the same time having a high degree of rigidity. It is known that for the production of sandwich parts, cores made of, for example, materials on a cellulose basis, polymers, foam materials such as polyurethane or wood can be used. Cores of this type can be given a very wide range of different forms, depending on the area of application. These forms include, for example, wave structures or honeycomb structures. The disadvantage of known sandwich panels is that they are only suitable to a limited degree for elastic deformation for the purpose of shaping the structure to be produced. Complex free forms are therefore almost impossible to realize. Further, such cores are only flexible to a limited degree in their design following the initial shaping, and with foam cores, for example, a new core must be produced which alters the structure of the product.

DE 20 2014 002 924 U1 describes a core for a sandwich part which consists of two folded partial layers.

SUMMARY

The object of the present invention is to create a folding core for the production of a lightweight structure which can be designed flexibly, is stable and has the simplest possible structure, and which is suitable as a modular system.

The present invention relates to a method for producing a folding core for a lightweight structure, wherein, in a first method step, bending lines are applied onto a deformable flat semi-finished product, which is deformed in two congruent partial areas with square outer contours and a shared bending line, with a deforming tool comprising two tool halves, whereby one tool half generates a first deformation force, which is directed against a second deformation force generated by another tool half and which two forces act orthogonally in relation to the flat semi-finished product, and then, in a second method step, a three-dimensional folding core is produced, whereby simultaneously transverse forces are applied which have an orthogonal direction of impact in relation to each other and to the first and second deformation force, According to the invention, it is provided that the one tool half has bending lines, which in the center in a section provided for the first partial area of the one tool half form a square, the edges of which run parallel to the outer contours of the first partial area, and that the one tool half has additional bending lines, which, in a section provided for the second partial area of the one tool half form two rectangles, which lie on the outer contours with one edge respectively, and that the one and the other tool half have collinear bending lines, the stringing together of which halves each of the two partial areas with square outer contours into two rectangles and divides the two partial areas with square outer contours into four rectangles in total, and that the one and the other tool half have diagonally aligned bending lines, the extensions of which cut the outer contours at a 45-degree angle, wherein all diagonal bending lines which are assigned to the one tool half and lie in the section for the first partial area have a total length that is identical to all diagonal bending lines of the one tool half in the section for the second partial area, and all diagonal bending lines which are assigned to the other tool half and lie in the section for the first partial area have a total length that is identical to all diagonal bending lines of the other tool half in the section for the second partial area.

The method according to the invention offers the advantage on the one hand that a folding core is producible which is single-layered, while having areas on its upper and lower side which essentially correspond to planar contact surfaces. Thus, it can be used in a particularly simple manner for construction purposes, and is far more easily producible and structured than the known prior art, for example. However, the producible folding core is compatible with the same folding cores, in other words, several of the folding cores can be slotted together. Further, the producible folding core is dimensionally scalable. This can be done both by producing a folding core while scaling the first and second partial area, as well as by producing several first and/or second partial areas adjacent to each other or adjoined to each other. This will be described in greater detail below. Here, the method according to the invention can be conducted in a particularly simple and fast manner. Different folding cores are also producible in a particularly simple and fast manner. Purely as an example, only the size of the semi-finished product can be changed, which then accordingly covers a larger or smaller area of the tool. The producible folding cores are advantageously adaptable with regard to their rigidity. This can be achieved purely as an example by adding corresponding bending lines for the production of reinforcing ribs on the folding core, or by scaling the size of the first and second partial area.

In a preferred embodiment of the present invention, it is provided that the deformation tool comprises an additional quantity of sections for first partial areas and for second partial areas, so that precisely this additional quantity of congruent partial areas is also deformed, and as a result a folding core results that is dimensionally scalable.

In other words, it is preferably provided that a folding core is produced that is dimensionally scalable, wherein the deformation tool used comprises at least one additional section for an additional first partial area and/or at least one additional section for an additional second partial area.

Figure 2:
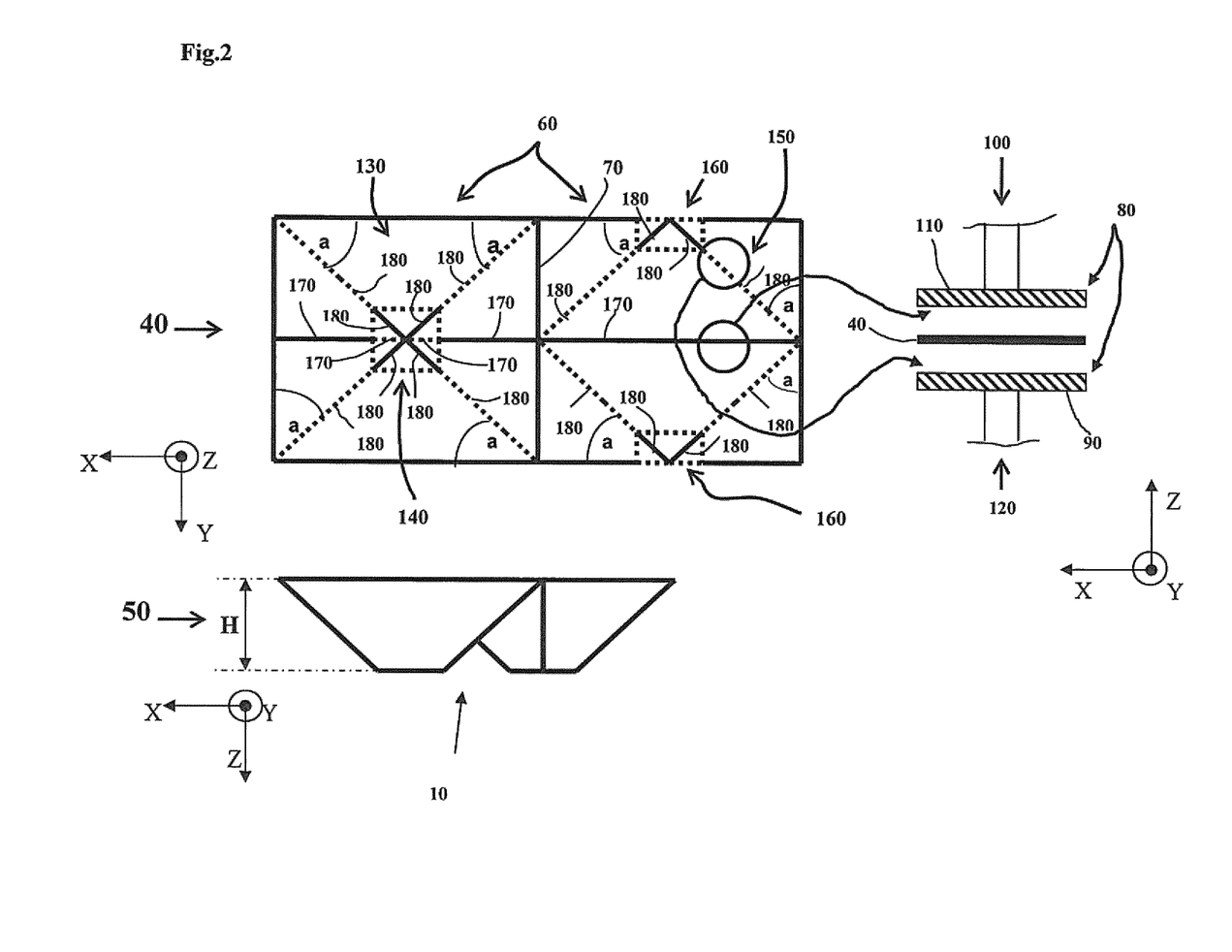
FIG. 2 shows a schematic drawing of a method according to the invention with reference to a folding scheme of a pair of elementary cells of a first type and of a second type in a preferred embodiment.

Each existing additional section for an additional first partial area here either adjoins an outer contour of another first partial area in a y direction (see FIG. 2) or adjoins an outer contour of a second partial area in an x direction (see FIG. 2).

Additionally, each existing additional section for an additional second partial area either adjoins an outer contour of another second partial area in a y direction or adjoins an outer contour of a first partial area in an x direction.

Thus, it emerges for the method that at least one additional congruent partial area of the deformable flat semi-finished product is also deformed. Preferably, at least two additional congruent partial areas are deformed. In a further preferred manner, a quantity of additional congruent partial areas are deformed, which correspond to a desired size of the folding core to be produced. Here, it is self-evident to a person skilled in the art that they must adapt the entire size of the flat semi-finished product to the size of the deforming tool or to the folding core to be produced.

Against the background of what is described above, it should be noted that the term outer contours of the congruent partial areas does not necessarily mean that the outer contours restrict the flat semi-finished product or even the folding core outwards. If further congruent partial areas adjoin, an outer contour here merely forms a transfer between two different congruent partial areas.

In a preferred embodiment of the present invention, with non-dimensionally stable semi-finished products, subsequent treatment is carried out to achieve dimensionally stable properties and with dimensionally stable products process conditions are generated to achieve non-dimensionally stable properties.

In a preferred manner, suitable process conditions are created in order to achieve the ability of materials to plastically deform. Purely as an example, with materials such as metal or thermoplastics, this can be a temperature regulation. Thus, the corresponding materials can be advantageously processed in the method, and are dimensionally stable on completion of the method. If for example impregnable materials such as paper or CFRP are used, these remain flexible following the production of the folding core. In a preferred manner, subsequent treatment is conducted to produce stably formed properties. This can be achieved for example through treatment with artificial resin in a corresponding form. The flat semi-finished product is here particularly suitable for coatings and structured multiple-layer coatings consisting of different materials, as a result of which the level of effort involved with the method is very low. The folding cores are then initially still flexibly formable and can be affixed in a desired design. Depending on the material, therefore, flexible semi-finished products or those which are dimensionally stable are present as an input into the method. If they are semi-finished products which are dimensionally stable, these are rendered flexible for the implementation of the method with the means known to persons skilled in the art. If the semi-finished products are flexible per se, these are preferably rendered dimensionally stable in a subsequent treatment.

Advantageously, with the method, folding cores can be produced with a very wide range of different and complex forms. In a state of dimensional stability, these folding cores also have enormous statical properties without cover areas, so that they can also be used as an independent lightweight structure.

To apply the bending lines, rotary dies, flatbed plotters, embossing stamps or other tools known to persons skilled in the art can be used.

In a preferred embodiment of the present invention, it is provided that the quantity of congruent partial areas is deformed which corresponds to a multiple of two. Thus, advantageously, very compact through to very large folding cores can be produced.

A further aspect of the invention relates to a folding core for a lightweight structure, produced from a deformable flat semi-finished product, comprising two types of elementary cells, which are present in pairs with each other, wherein the first type of elementary cells and the second type of elementary cells are produced from two congruent partial areas with square outer contours of the semi-finished product in the method according to the invention.

Such folding cores offer the advantage that they are simply and quickly producible, and flexibly designable, and have a high level of dimensional stability and definable rigidity properties. Such folding cores are advantageously scalable and are suitable as a modular system.

The folding cores according to the invention can be produced from a plurality of different materials. These include, for example, metallic materials, glass, CFRP, GRP, natural fibers, basalt fibers, paper, elastomers (rubber, polyurethane, etc.), thermoplastic materials and impregnable materials. The folding cores according to the invention are for example also suitable as concrete formwork or thermal insulation.

The folding cores according to the invention can be rendered dimensionally stable with a plurality of different binding materials. These include, for example, synthetic resins, water glass, cement, casein, lignin, acrylates, rubber, silicone, latex, etc.

Impregnable materials can be impregnated with both curing binding agents and with elastic binding agents. Folding cores made of rubber or elastomers are suitable, for example, for mattresses, tires and seals. Folding cores made of carbon fiber and cement are suitable, for example, as textile concrete or fiber concrete for prefabricated concrete parts.

Depending on which material combination is selected, folding cores according to the invention are produced with different properties.

In a preferred embodiment of the present invention, it is provided that the elementary cells respectively end on one plane on an upper side and on a lower side. This offers the advantage that on the upper side and the lower side, contact surfaces are formed. For example, the folding core is designed, via the contact surfaces, to absorb and to direct forces, and can furthermore be connected to additional structural elements.

In a further preferred embodiment of the present invention, it is provided that the folding core comprises a quantity of pairs of elementary cells of the first type and of the second type, so that the folding core is dimensionally scaled in accordance with this quantity. Thus, large-area folding cores can advantageously also be produced.

A further aspect of the present invention relates to a structural part, comprising a folding core according to the invention and at least one additional folding core, wherein the folding core and the additional folding core are slotted together. Such structural parts offer the advantage that they are flexibly designable and can absorb high loads at the same time.

In a preferred embodiment of the present invention, it is provided that the structural part comprises at least one additional folding core and several folding cores are slotted together. Such a structural part offers the advantage that it is also producible in large volumes, and can additionally be furnished with drainage properties. Through the combination of suitable folding cores, drainage structures can be produced on up to three planes. The drainage properties arise from the channels formed between the folding cores that are slotted together, which result from the specific structure of the folding cores. In a particularly advantageous manner, due to the structure of the folding cores the different planes are decoupled from each other in a fluid manner when the folding cores are fully slotted together.

In a further preferred embodiment of the present invention, it is provided that at least two folding cores are slotted together, of which at least one folding core consists of other elementary cells than at least one second folding core. This offers the advantage that complex connections are possible, and additionally, the rigidity properties within the structural part are variable.

On the basis of the method according to the invention, the folding core according to the invention can initially be produced. With the folding core according to the invention, the structural part according to the invention can also be produced. Thus, the advantages named in relation to the respective aspects of the invention also apply accordingly to all other aspects of the invention.

The individual features disclosed can further be advantageously combined with each other unless no other information is provided.

BRIEF DESCRIPTION OF THE DRAWINGS

The invention will now be explained in greater detail below with reference to an exemplary embodiment and the related drawings. In the FIGS..

DETAILED DESCRIPTION

Figure 1:
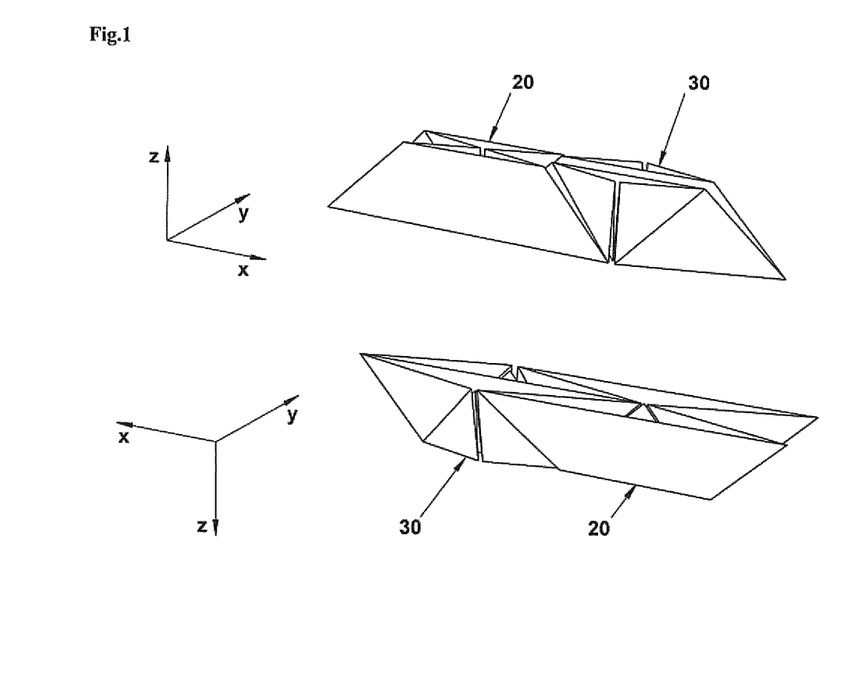
FIG. 1 shows a schematic drawing of a pair of elementary cells of a first type and of a second type in a preferred embodiment.

FIG. 1 shows a schematic drawing of a pair of elementary cells of a first type and of a second type in a preferred embodiment. The upper section of FIG. 1 and the lower section of FIG. 1 show a pair of elementary cells of a folding core according to the invention in two different views. The upper section of FIG. 1 shows the pair of elementary cells on an x-z plane, wherein the direction of view is essentially aligned along a positive y direction. The lower section of FIG. 1 shows the pair of elementary cells, also on the x-z plane, wherein the latter, in contrast to the upper section of FIG. 1, is rotated essentially around 180 degrees around the y axis. The pair of elementary cells comprises a first type of elementary cell 20 and a second type of elementary cell 30.

FIG. 2 shows a schematic drawing of a method according to the invention with reference to a folding scheme of a pair of elementary cells of a first type and of a second type in a preferred embodiment. The upper left section of FIG. 2 shows a deformable flat semi-finished product 40. The lower left section of FIG. 2 shows a folding core 50 produced in the method according to the invention. The folding core 50 comprises a pair of elementary cells 10 described as an example in FIG. 1. The direction of view is here oriented on the x-z plane in a negative y direction. In the case of the deformable flat semi-finished product 40, the direction of view on the x-y plane lies in the direction of negative z values. The deformable flat semi-finished product 40 comprises two congruent partial areas with square outer contours 60. These areas are demarcated from each other by a shared bending line 70.

In a first method step, the deformable flat semi-finished product 40, as shown in the middle right-hand section of FIG. 2, is positioned on the x-y plane between two tool halves 80 and a first deformation force 120 is generated by a tool half 90, and a second deformation force 100 is generated by another tool half 110. The deformation forces 100, 120 act orthogonally in relation to the flat semi-finished product 40 and respectively in the opposite z direction. The bending lines of the tool halves 80 and the folding scheme are indicated schematically in the upper left-hand section of FIG. 2 on the deformable flat semi-finished product. The broken bending lines are here assigned to the one tool half 90. The unbroken lines are assigned to the other tool half 110. The assignment can be in reverse, however. In cases in which bending lines concur with outer contours, in other exemplary embodiments, further congruent partial areas of the deformable flat semi-finished product 40 can be connected. Therefore, in this exemplary embodiment, no consistent differentiation is made between bending line and outer contours. In the center in a section provided for the first partial area 130 of the one tool half 90, a quantity of bending lines of the one tool half 90 form a square 140, which is arranged in the center in the first partial area 130. The edges of the square 140 are arranged parallel to the outer contours and the shared bending line 70. The one tool half 90 has a further quantity of bending lines, which in a section provided for the second partial area 150 of the one tool half 90 form two rectangles 160. The quantity of rectangles 160 thus equals double the quantity of squares 140 present. The rectangles 160 lie partially on the outer contours of the right-hand one of the two congruent partial areas with square outer contours 60. The one tool half 90 and the other tool half 110 further have a quantity of collinear bending lines 170, the stringing together of which divides the congruent partial areas with square outer contours 60 into four rectangles in total. Each of the congruent partial areas with square outer contours 60 is therefore halved into two rectangles. Further, the one tool half 90 and the other tool half 110 comprise a plurality of diagonally aligned bending lines 180. Their extensions cut the outer contours at an angle of 45 degrees. Lines shown as broken are bending lines which are assigned to the one tool half 90. Lines shown as unbroken are bending lines which are assigned to the other tool half 110. A total length of all diagonal bending lines 180, which are assigned to the one tool half 90 (broken) and which lie in the section for the first partial area 130, corresponds to the total length of all diagonal bending lines 180, which are assigned to this one tool half 90 and which lie in the section for the second partial area 150. The same applies to the other tool half 110. Thus, a total length of all diagonal bending lines 180, which are assigned to the other tool half 110 (unbroken) and which lie in the section for the first partial area 130, corresponds to the total length of all diagonal bending lines 180 of said other tool half 90 in the section determined for the second partial area 150.

In a second method step, a three-dimensional folding core is then produced. For this purpose, transverse force pairs are simultaneously applied in an x and y direction onto the deformable flat semi-finished product 40, wherein said product is compressed over the bending lines in an x and y direction and forms the three-dimensional folding core in a z direction. Preferably, the one tool half 90 and the other tool half 110 are here opened in a controlled manner, in order to enable the formation of the pair of elementary cells 10 in a controlled manner.

Figures 3, 4:
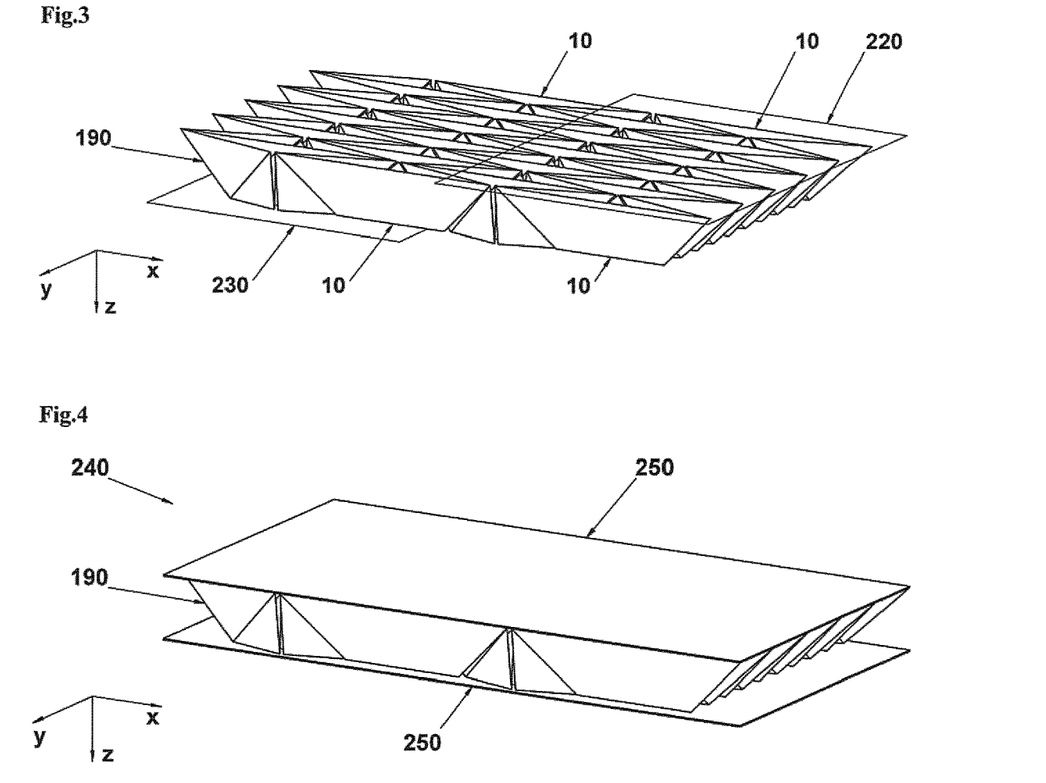
FIG. 3 shows a schematic drawing of a folding core according to the invention in a preferred embodiment.
FIG. 4 shows a schematic drawing of a structural part according to the invention in a preferred embodiment.

FIG. 3 shows a schematic drawing of a folding core according to the invention in a preferred embodiment. The folding core 190 comprises a plurality of pairs of elementary cells 10. An upper side and a lower side of the folding core 190 respectively lie on a plane 220, 230. The planes 220, 230 respectively extend over the entire upper side or the entire lower side, and are here only indicated schematically. Thus, even contact surfaces result on the upper side and the lower side.

FIG. 4 shows a schematic drawing of a structural part according to the invention in a preferred embodiment. The structural part 240 consists of a folding core 190 according to the invention, on the upper side and lower side of which one plate 250 is arranged respectively.

Figure 5:
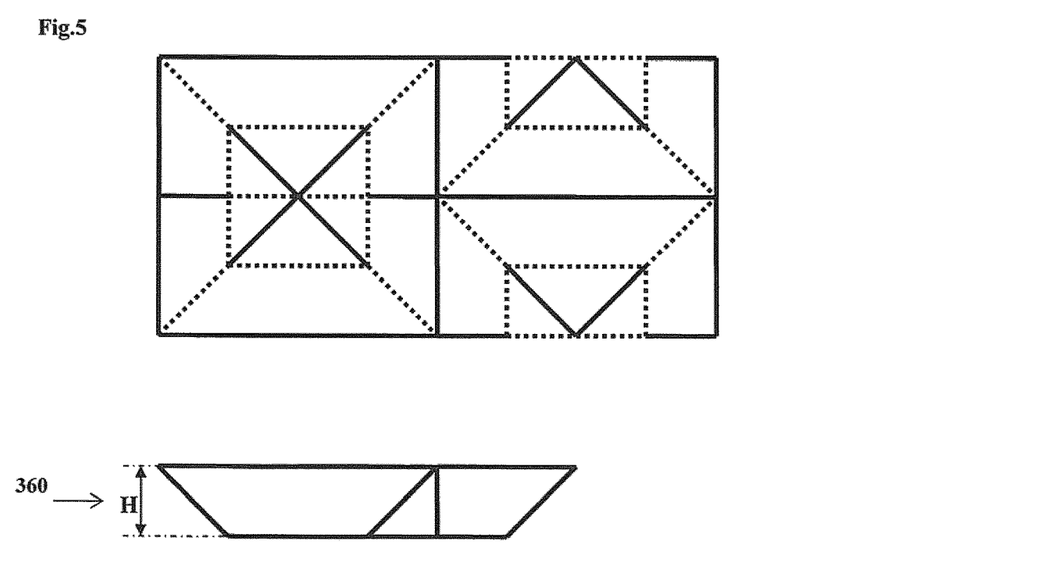
FIGS. 5-7 show schematic drawings of different folding schemes of pairs of elementary cells of a first type and of a second type in preferred embodiments.
Figure 6:
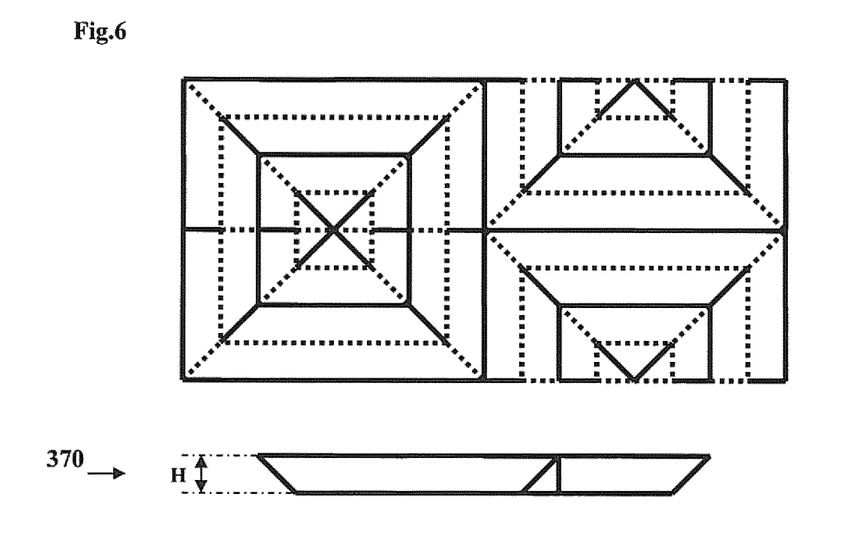
Figure 7:
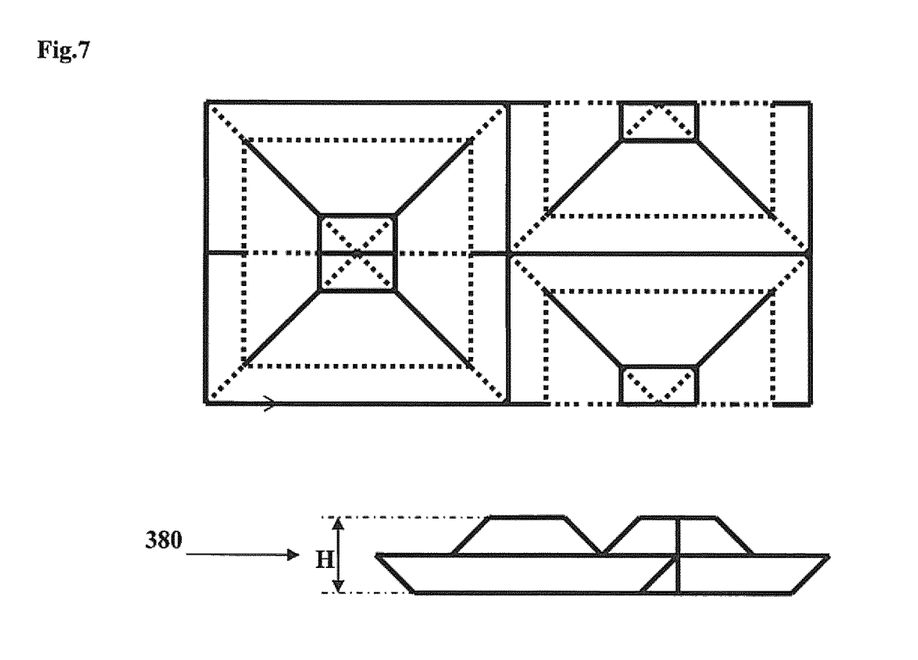

FIGS. 5-7 show schematic drawings of different folding schemes of pairs of elementary cells of a first type and of a second type in preferred embodiments. The folding scheme shown in FIG. 5 shows as an example a scaled form of the folding scheme shown in FIG. 2. It can be seen from FIG. 5 that the dimensions of the bending lines which have been altered compared to FIG. 2 lead to a lower height h of the resulting folding core. FIG. 6 shows as an example a further folding scheme and a resulting folding core with a further reduced height h compared to the folding core shown in FIG. 5. FIG. 7 shows a further alternative folding scheme.

Figure 8:
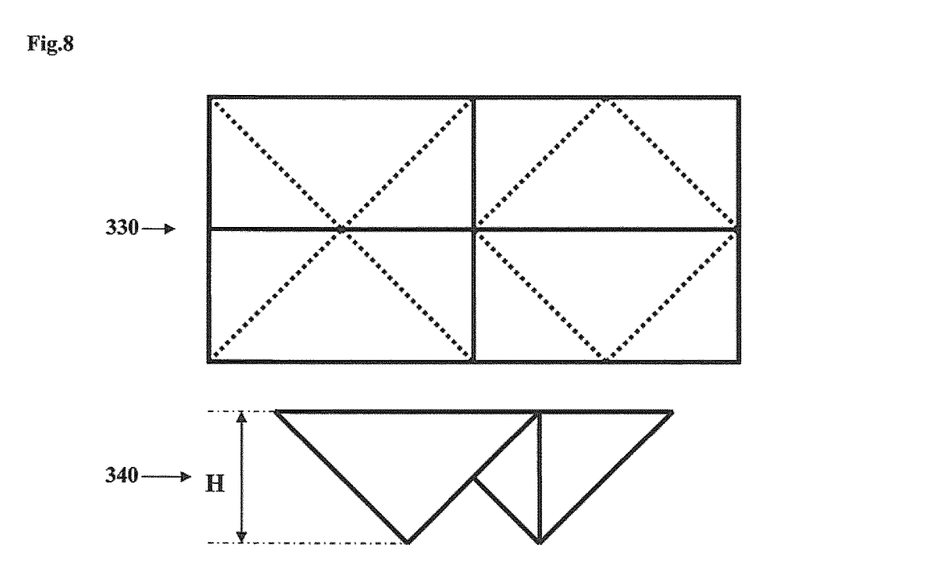
FIG. 8 shows a schematic drawing of a supplementary folding scheme and a supplementary folding core producible with it in a preferred embodiment.

FIG. 8 shows a schematic drawing of a supplementary folding scheme 330 and a supplementary folding core 340 that is producible with the folding scheme, which can be connected to the folding core according to the invention, in a preferred embodiment. The steps for producing the folding core shown in FIG. 2 are, taking into account the different system of the bending lines, transferable to the production of the supplementary folding core 340. It can be seen from FIG. 8 that this supplementary folding core 340 has form characteristics 260 that are tapered on a lower side. In contrast to this, the folding cores according to the invention have even contact surfaces, as shown in FIG. 3, for example.

Figure 9:
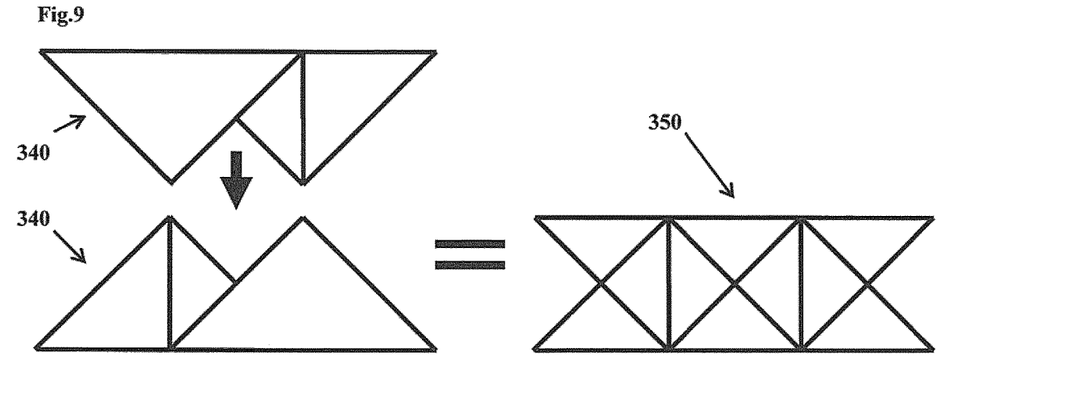
FIG. 9 shows a schematic drawing of a supplementary structural part made of two supplementary folding cores that are slotted together based on a supplementary folding scheme in a preferred embodiment.

FIG. 9 shows a schematic drawing of a supplementary structural part 350 made of two supplementary folding cores 340 that are slotted together based on a supplementary folding scheme 330 in a preferred embodiment. It can be clearly seen from FIG. 9 that in order to produce the structural part, two individual supplementary folding cores 340, which are shown in the left-hand section of FIG. 9, are slotted together and lead to the supplementary structural part 350 shown on the right-hand side of FIG. 9. The supplementary structural part 350 is a dense composite of both supplementary folding cores 340.

Figure 10:
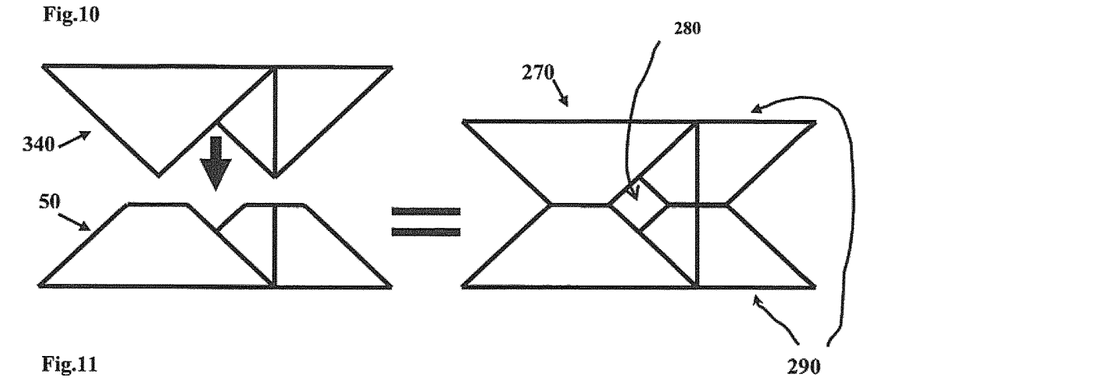
FIGS. 10-13 show schematic drawings of structural parts, consisting of a folding core each according to the invention and a supplementary core each based on a supplementary folding scheme in a preferred embodiment.

FIGS. 10 to 13 show schematic drawings of structural parts, consisting of a folding core each according to the invention and one supplementary core 340 each, based on a supplementary folding scheme 330 in a preferred embodiment; The left-hand section of FIG. 10 shows how a supplementary folding core 340, based on a supplementary folding scheme 330, which is described in FIG. 8, is connected to a folding core according to the invention, which corresponds to the folding core 50 described in FIG. 2. The resulting structural part 270 is shown in the right-hand section of FIG. 10. It can be clearly seen that intermediate spaces 280 are formed, which can fulfil a drainage function. The structural part 270 has planar surfaces 290.

Figure 11:
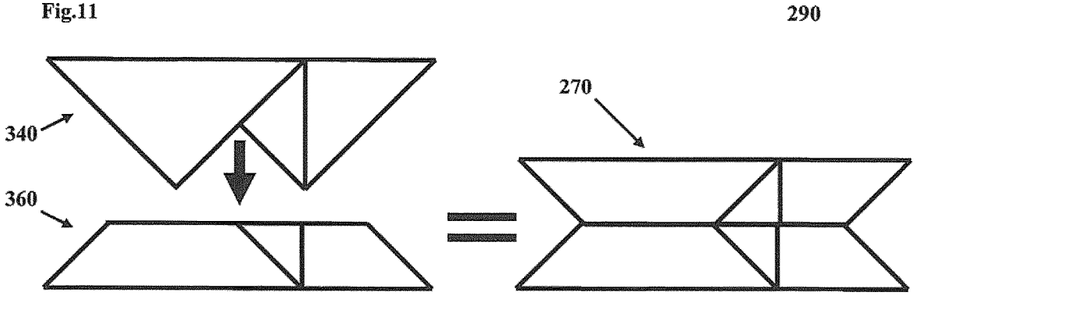
Figure 12:
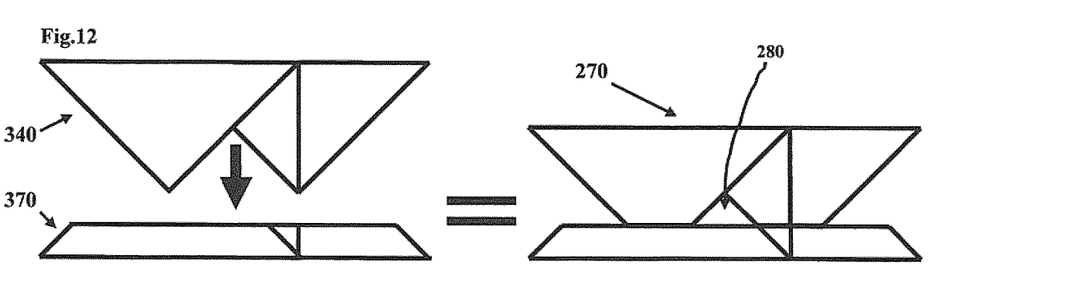
Figure 13:
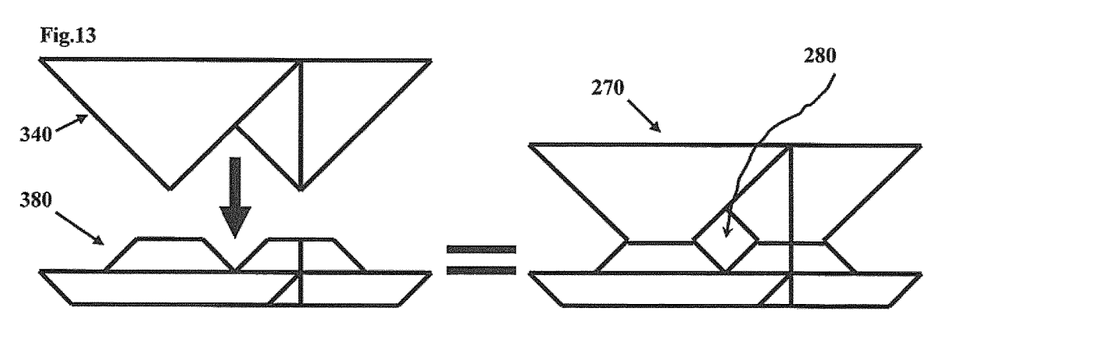

In a similar manner to FIG. 10, FIGS. 11 to 13 also show different structural parts 270. Here, FIG. 11 shows on the lower left-hand side the folding core 360 described in FIG. 5. Here, FIG. 12 shows on the lower left-hand side the folding core 370 described in FIG. 6. FIG. 13 shows on the lower left-hand side the folding core 380 described in FIG. 7.

Figure 14:
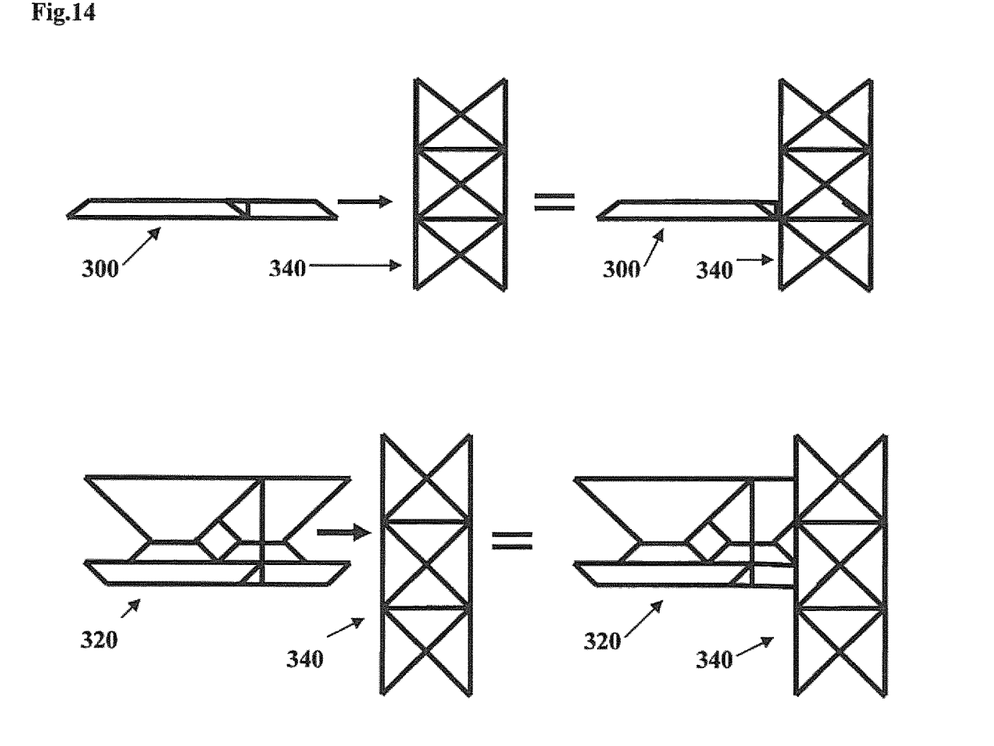
FIG. 14 shows a schematic drawing of structural parts consisting of several folding cores consisting of different elementary cells respectively in a preferred embodiment.

FIG. 14 shows a schematic drawing of structural parts consisting of several folding cores consisting of different elementary cells respectively in a preferred embodiment. The upper section of FIG. 14 shows a structural part comprising a folding core 300 according to the invention, which is also described in the lower left-hand section of FIG. 12 and in FIG. 6. The folding core 300 is insertable at the side into a supplementary structural part 340, which is based on a supplementary folding scheme 330. This supplementary folding scheme 330 is also described in FIG. 8, and the supplementary structural part 340 is also described in FIG. 9. The lower section of FIG. 14 shows a similar example with the supplementary structural part 340, into which a further structural part 330 according to the invention is insertable. The structural part 320 according to the invention comprises a folding core 380 according to the invention, which is already described in FIGS. 7 and 13, and further comprises a supplementary folding core 340 based on a supplementary folding scheme 330.

Figure 15:
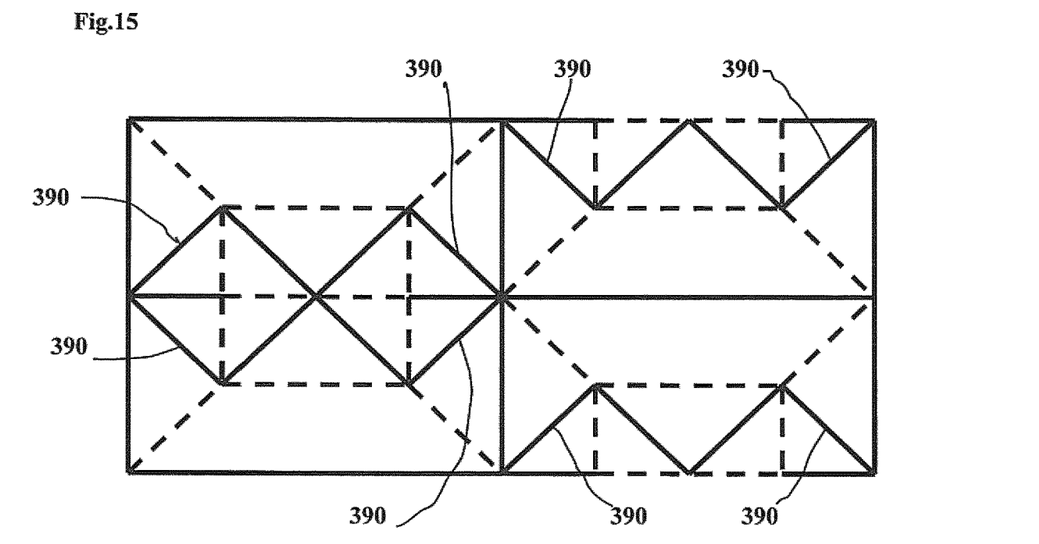
FIGS. 15-19 show schematic drawings of further folding schemes according to the invention of pairs of elementary cells of a first type and of a second type in a preferred embodiment, which have auxiliary bending lines.
Figure 16:
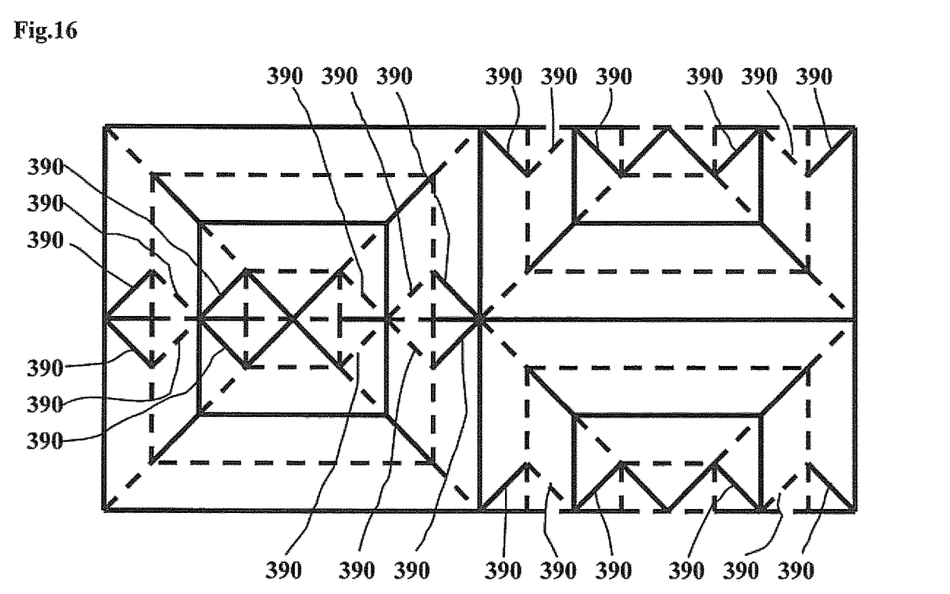
Figure 17:
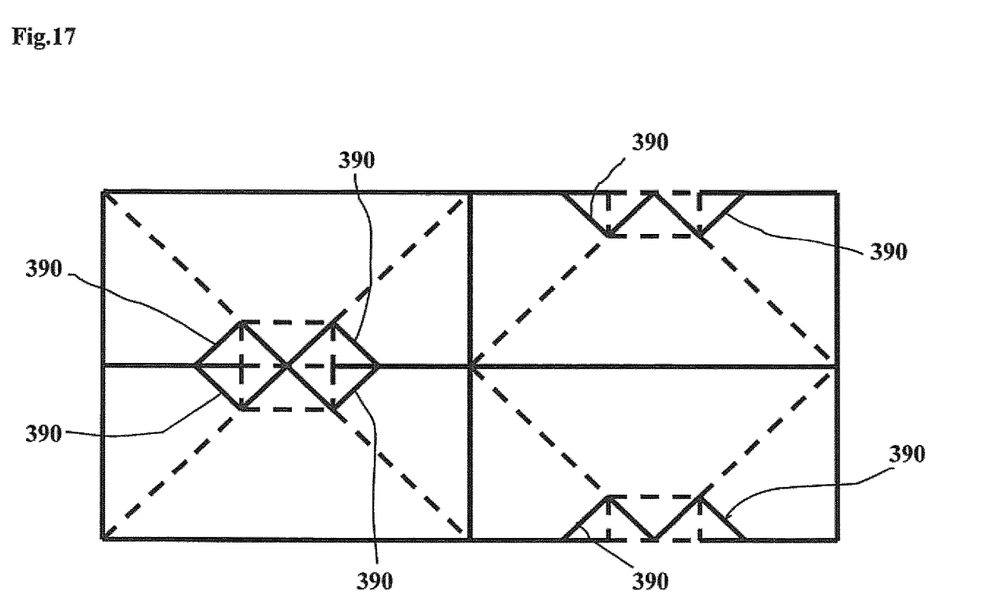
Figure 18:
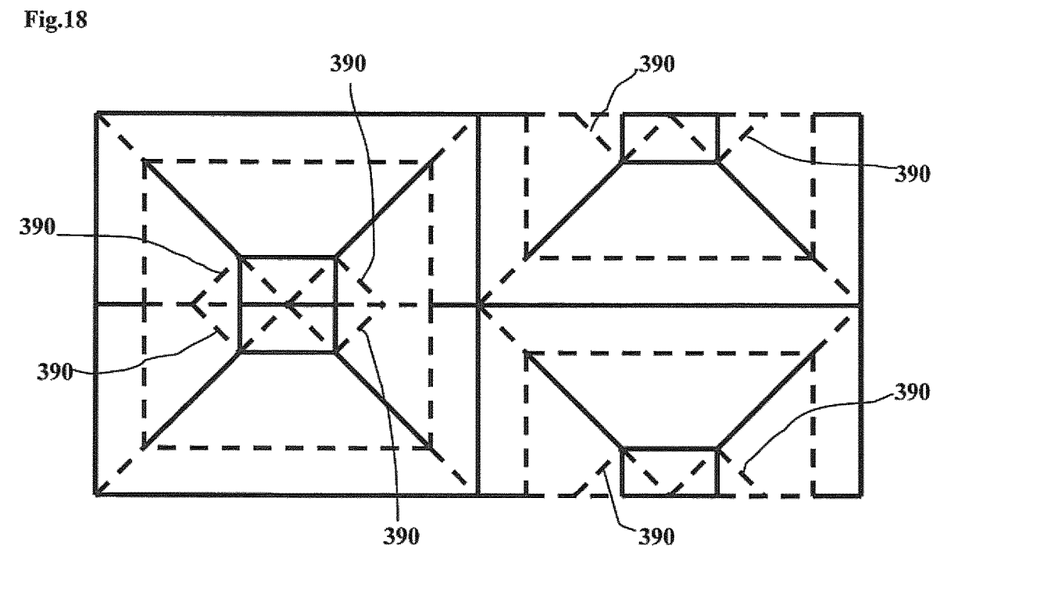
Figure 19:
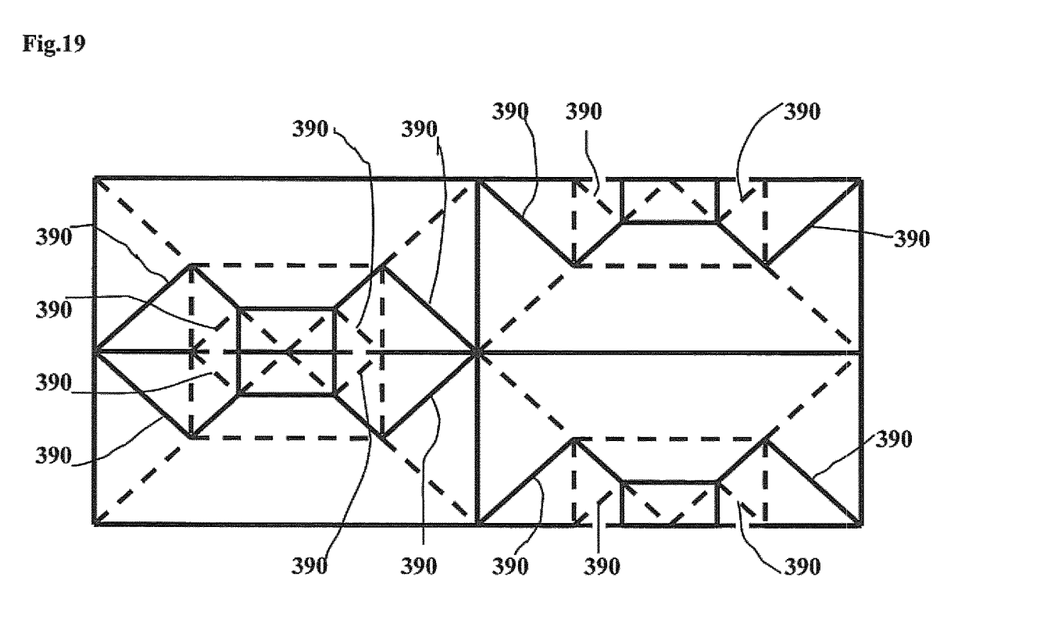

FIGS. 15 to 19 show schematic drawings of further folding schemes according to the invention of pairs of elementary cells of a first type and of a second type in a preferred embodiment, which have auxiliary bending lines. The folding scheme shown in FIG. 15 is here based on that described in FIG. 5. The auxiliary lines 390 result in the folding scheme being better processable, and a corresponding folding core is more easily producible. This applies in a similar way to the folding scheme, which is shown in FIGS. 16 to 19, wherein the folding scheme shown in FIG. 16 is based on the folding scheme described in FIG. 6. The folding scheme shown in FIG. 17 is based on the folding scheme described in FIG. 2. The folding scheme shown in FIG. 18 is based on the folding scheme described in FIG. 7. The folding scheme shown in FIG. 19 is also based on the folding scheme described in FIG. 7.

Figure 20:
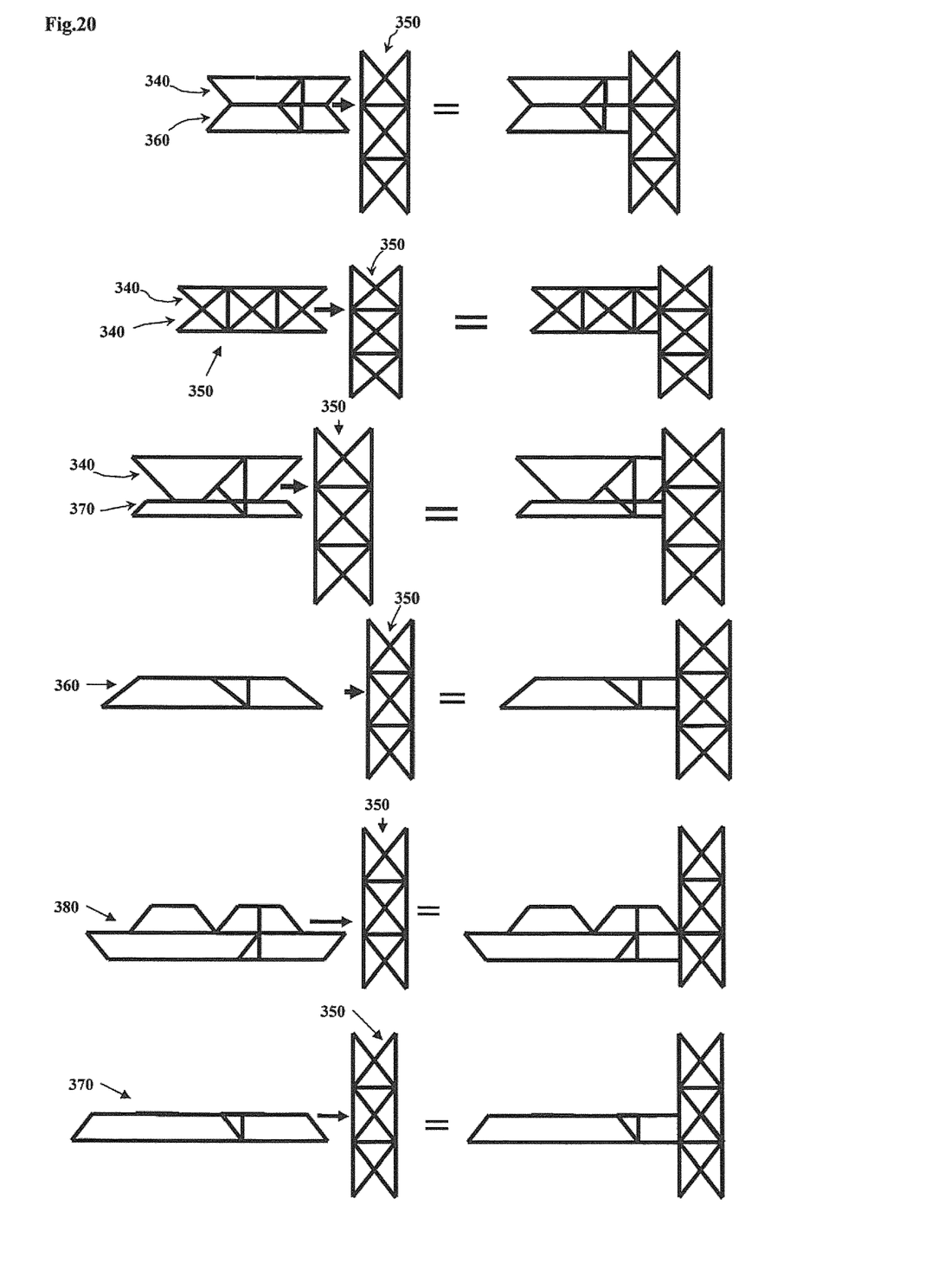
FIG. 20 shows a schematic drawing of structural parts consisting of several folding cores consisting of different elementary cells respectively in a preferred embodiment.

FIG. 20 shows a schematic drawing of structural parts consisting of several folding cores consisting of different elementary cells respectively in a preferred embodiment. Insofar as the reference numerals used correspond to those used in one of FIGS. 1 to 19, the features are the same. The above described in relation to the respective FIGS. 1 to 19 also applies to FIG. 20.

LIST OF REFERENCE NUMERALS

10 Pair of elementary cells
20 First type of elementary cell
30 Second type of elementary cell 40 Deformable flat semi-finished product
50 Folding core
60 Congruent partial areas with square outer contours
70 Shared bending line
80 Tool halves
90 One tool half
100 Second deformation force
110 Other tool half
120 First deformation force
130 First partial area
140 Square
150 Second partial area
160 Rectangle
170 Collinear bending lines
180 Plurality of diagonally aligned bending lines
190 Folding core
200 Upper side
210 Lower side
220 Plane
230 Plane
240 Structural part
250 Plate
260 Tapering form characteristics
270 Structural part
280 Intermediate spaces
290 Planar surfaces
300 Folding core
320 Further structural part
330 Supplementary folding scheme
340 Supplementary folding core
350 Supplementary structural part
360 Folding core
370 Folding core
380 Folding core
390 Auxiliary line
a angle
h height

The invention claimed is:

1. A structural part comprising:
a first folding core and a second folding core, the first folding core and the second folding core being slotted together,
wherein the first folding core is produced by a method comprising:
a first method step, wherein bending lines are applied onto a deformable flat semi-finished product, which is deformed in two congruent partial areas having square outer contours and a shared bending line, with a deforming tool comprising two tool halves, whereby a first tool half from among the two tool halves generates a first deformation force, which is directed against a second deformation force generated by a second tool half from among the two tool halves, wherein the first and second deformation forces act orthogonally in relation to the deformable flat semi-finished product; and
a second method step after the first method step, wherein the first folding core is produced, whereby simultaneously, transverse forces are applied, which have an orthogonal direction of impact in relation to each other and to the first and second deformation forces,
wherein the first tool half has bending lines, which, in a center in a section of the first tool half provided for a first partial area from among the two congruent partial areas, form a square, the edges of which are to run parallel to the outer contours of the first partial area,
wherein the first tool half has additional bending lines, which, in a section of the first tool half provided for a second partial area from among the two congruent partial areas, form two rectangles, each of which are to lie on the outer contours of the second partial area with one edge respectively,
wherein the first tool half and the second tool half have collinear bending lines, the stringing together of which are to halve each of the two congruent partial areas with square outer contours into two rectangles and are to divide the two congruent partial areas with square outer contours into four rectangles in total, and
wherein the first tool half and the second tool half have diagonally aligned bending lines, the extensions of which are to cut the outer contours at a 45-degree angle, wherein all diagonal bending lines which are assigned to the first tool half and lie in the section for the first partial area have a total length that is identical to that of all diagonal bending lines of the first tool half in the section for the second partial area, and all diagonal bending lines which are assigned to the second tool half and lie in the section for the first partial area have a total length that is identical to that of all diagonal bending lines of the second tool half in the section for the second partial area.

2. The structural part according to claim 1,
wherein the first folding core is produced by the method, whereby the deforming tool used comprises at least one additional section for an additional first partial area and/or at least one additional section for an additional second partial area,
wherein each existing additional section for an additional first partial area either adjoins an outer contour of another first partial area in a y direction or adjoins an outer contour of a second partial area in an x direction, and
wherein each existing additional section for an additional second partial area either adjoins an outer contour of another second partial area in a y direction or adjoins an outer contour of a first partial area in an x direction, and thus, at least one additional congruent partial area of the deformable flat semi-finished product is deformed.

3. The structural part according to claim 1,
wherein with non-dimensionally stable semi-finished products, subsequent treatment is carried out to achieve dimensionally stable properties, and
wherein with dimensionally stable products, process conditions are generated to achieve non-dimensionally stable properties.

4. The structural part according to claim 1, wherein the first folding core is for a lightweight structure and is produced from the deformable flat semi-finished product comprising two types of elementary cells, which are present in pairs with each other, wherein a first type of elementary cells from among the two types of elementary cells and a second type of elementary cells from among the two types of elementary cells are produced from the two congruent partial areas with square outer contours of the deformable flat semi-finished product according to the method.

5. The structural part according to claim 1, wherein elementary cells of the first folding core end in one plane on an upper side of the first folding core and end in another plane on a lower side of the first folding core.

6. The structural part according to claim 1, wherein the first folding core comprises a quantity of pairs of elementary cells of a first type and of a second type, so that the first folding core is dimensionally scaled in accordance with this quantity.

7. The structural part according to claim 4, wherein the first folding core consists of different elementary cells to that of the second folding core.

\* \* \* \* \*